United States Patent Office 2,925,421
Patented Feb. 16, 1960

2,925,421
CONDENSATION OF PYRIDINE DICARBOXYLIC ACIDS WITH AMINO ANTHRAQUINONES

Roy A. Pizzarello, Mount Vernon, and Paul Resnick, Brooklyn, N.Y., and Alfred F. Schneid, New Milford, N.J., assignors to Interchemical Corporation, New York, N.Y., a corporation of Ohio No Drawing. Application September 25, 1957
Serial No. 686,017
9 Claims. (Cl. 260—272)

This invention relates to the preparation of a new group of compounds; i.e. the condensation products of (a) one molecular proportion of a pyridine dicarboxylic acid chloride with (b) two molecular proportions of an alpha amino anthraquinone.

We have found that a new group of compounds having very desirable pigmentary properties results from condensing in an inert solvent for the reactants, (a) one molecular proportion of a pyridine dicarboxylic acid chloride with (b) two molecular proportions of an alpha amino anthraquinone, at a temperature not in excess of 150° C.

The use of pigments in coloring textiles is historically very old, but such use was of little commercial importance, outside of specialty applications, until pigmented water-in-lacquer emulsion printing pastes were introduced, in about 1938. Since then, the use of pigments for coloring textiles has expanded considerably, and the popularization of "dope dyeing" of synthetics, i.e. incorporation of color into the spinning solution has increased the demand for satisfactory pigments.

Our new group of compounds meet this demand as they possess those properties most satisfactory for pigments for textile coloring; i.e. (1) rightness of shade, (2) resistance to fading by sun, etc., (3) resistance to soap, and (4) resistance to dry cleaning, such as perchloroethylene.

Pyridine dicarboxylic acid chlorides that are operable in the invention include the following: (a) 2,3-pyridine dicarboxylic acid dichloride (quinolinic acid dichloride); (b) 2,4-pyridine dicarboxylic acid dichloride (lutidinic acid dichloride); (c) 2,5-pyridine dicarboxylic acid dichloride (isocinchomeronic acid dichloride); (d) 2,6-pyridine dicarboxylic acid dichloride (dipicolinic acid dichloride); 3,4-pyridine dicarboxylic acid dichloride (cinchomeronic acid dichloride); and 3,5-pyridine dicarboxylic acid dichloride (dinicotinic acid dichloride).

As an alpha amino anthraquinone reactant, we prefer to use alpha amino anthraquinone itself; substituted alpha amino anthraquinones as e.g. the -4 benzoylamino derivative, the -4 chloro derivative, the -5 chloro derivative or the -8 chloro derivative can, however, be used.

We prefer to use either 2,3-pyridine dicarboxylic acid dichloride or 2,5-pyridine dicarboxylic acid dichloride for condensations with the alpha-amino anthraquinone reactant.

Generally, the new group of compounds can be represented structurally as

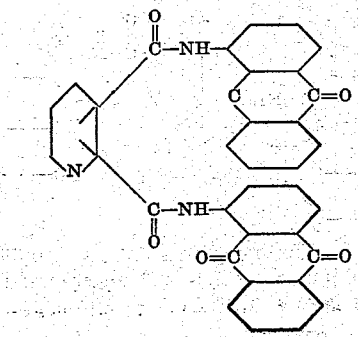

The reaction between the alpha amino anthraquinone and the pyridine dicarboxylic acid chloride is preferably carried out in an inert solvent for the reactants. The solvent should have a boiling point high enough to permit the reaction to proceed. We have used various chlorobenzenes (dichlorobenzenes-trichlorobenzenes etc.) perchloroethylene, nitrobenzene etc.

The reaction temperature may vary from 110° C.–150° C.

The pyridine dicarboxylic acid dichlorides can be prepared in conventional manner from the corresponding acids, e.g., by reacting thionyl chloride with the acid in the presence of the inert solvent.

Example 1

A solution of 2,3-pyridine dicarboxylic acid dichloride in ortho dichlorobenzene was prepared by charging to a 500 cc. flask 250 cc. of ortho dichlorobenzene, 20 grams (0.12 mole) of 2,3-dicarboxy pyridine and 37 cc. of thionyl chloride. The charge was then heated to 100° C. and held for 48 hours to insure complete solution. The temperature was then raised to 160° C. and the excess thionyl chloride distilled off. Then, the solution was cooled to 100° C. and clarified with charcoal and filter cell.

The acid chloride solution was then divided into two equal parts.

To one part of the acid dichloride solution was charged 18.5 grams (0.083 mole) of alpha amino anthraquinone. The temperature was raised to 150° C. and held for 3 hours. The reaction mixture was then cooled and the resulting product drowned in 500 cc. of acetone and filtered. The product was washed with acetone until the washings were colorless and then dried overnight in an oven at 60° C.

A yield of 16 grams of a yellow colored compound corresponding to the structure

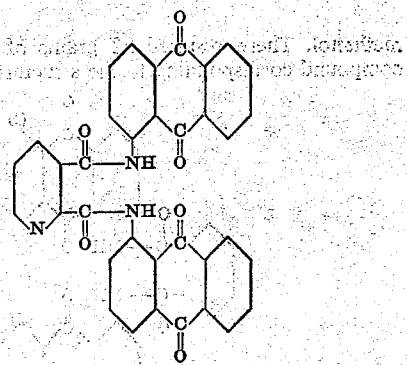

was obtained. The compound was resistant to solvents and possessed excellent lightfastness in a cellulose acetate film (200 plus hours in a fadeometer).

Example 2

To the other part of the acid dichloride solution prepared in Example 1 was charged 19.5 grams (0.077 mole) of alpha amino-4-methoxy anthraquinone. Maintaining the same reaction conditions and isolating the product in the same manner as in the previous example;

a yield of 10 grams of an orange colored compound corresponding to the structure

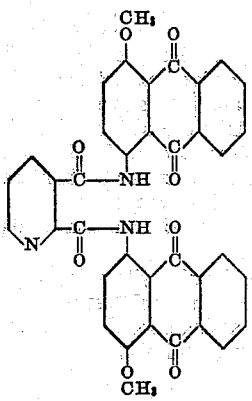

was obtained. The compound was resistant to solvents and possessed excellent lightfastness in a cellulose acetate film (200 plus hours in a fadeometer).

*Example 3*

The condensation product of 2,3-pyridine dicarboxylic acid dichloride and alpha amino-5-chloro-anthraquinone was prepared by mixing 17 grams (0.102 mole) of 2,3-pyridine dicarboxylic acid, 55 grams of thionyl chloride and 250 grams of ortho-dichlorobenzene at 85° C. until complete solution was obtained. The excess thionyl chloride was removed and the solution of acid chloride cooled to room temperature. To this solution was added 22 grams (0.085 mole) of alpha-amino-5-chloro-anthraquinone and the reaction heated at 140–150° C. for 3 hours. The reaction was then cooled to room temperature and drowned in 600 cc. of methanol. After filtration, the condensation product was washed clear with methanol. There resulted 22 grams of a bright yellow compound corresponding to the structure

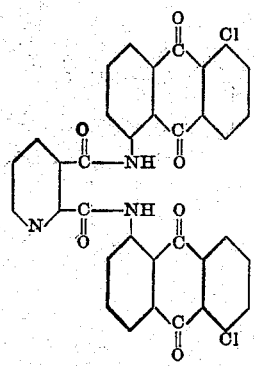

This compound was resistant to methanol (no bleed) and to acetone (no bleed) and had a minimal bleed in perchloroethylene. It possessed good lightfastness in a cellulose acetate film (150 hours in the AATCC fadeometer).

*Example 4*

A solution of 2-5 pyridine dicarboxylic acid dichloride in ortho dichloro benzene was prepared by charging to a 500 cc. flask 250 cc. of orthodichloro benzene, 20 grams (0.12 mole) of 2-5 pyridine dicarboxylic acid, and 37 cc. of thionyl chloride. The charge was heated to 100° C. and held for 48 hours to insure complete solution. Then, the temperature was raised to 160° C. and the excess thionyl chloride distilled off. The solution of acid dichloride was then cooled to 100° C., clarified with charcoal and filter cell and divided into two equal parts.

To one part of the acid dichloride solution was added 22 grams (0.0785 mole) of alpha-amino-8-chloro anthraquinone. The temperature was raised to 150° C. and held for 3 hours. After cooling to 80° C., the product was isolated by drowning in methanol, filtering and washing with alcohol until the washing was colorless. A yield of 22 grams of a greenish yellow colored compound corresponding to the structure

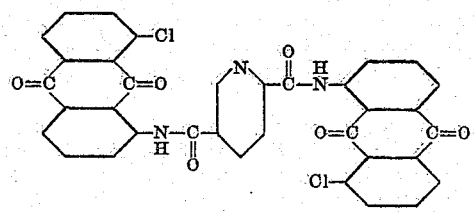

was obtained. The compound possessed good solvent resistance and lightfastness in a cellulose acetate film. (200 plus hours in fadeometer.)

*Example 5*

To the other part of the acid chloride solution prepared in Example 4 was added 29 grams (0.085 mole) of alpha-amino-4-benzoyl amino anthraquinone. The temperature was raised to 150° C. and held for 3 hours. After cooling to 80° C., the product was isolated by drowning in methanol, filtering and washing with alcohol until the washings were colorless. A yield of 30 grams of a red colored compound corresponding to the structure

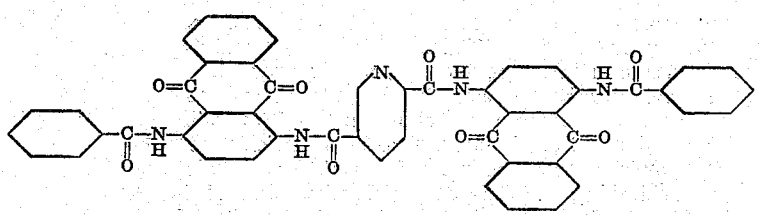

was obtained. The compound possessed excellent solvent resistance and excellent lightfastness in a cellulose acetate film (200 plus hours in the fadeometer).

*Example 6*

To a 500 cc. flask was charged 21.4 grams (0.1 mole) of isocinchomeronyl chloride, 250 cc. of orthodichloro benzene and 40 grams (0.18 mole) of alpha-amino anthraquinone. The charge was heated to 130° C. and held there for 3 hours. After cooling to 50° C., the product was filtered and washed with methanol until the washings were colorless. The product was then dried at 70° C. and a yield of 45 grams of reddish yellow compound in crystalline form and corresponding to the structure

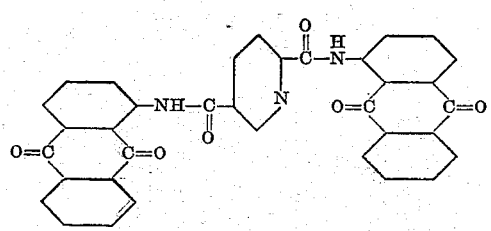

was obtained. The compound possessed excellent lightfastness (200 plus hours in a fadeometer) and in cellulose acetate films gave a light green yellow appearance.

Example 7

To a 1 liter flask was charged 300 cc. of ortho dichloro benzene, 17 grams (0.1 mole) of isocinchomeronic acid and 55 cc. of thionyl chloride. The charge was heated to 95° C. and held for 48 hours until completely solubilized. The temperature was then raised to 120° C. and the excess thionyl chloride distilled off. 2 grams of Darco and 2 grams of filter cell were added for clarification and the charge then filtered at 80° C.

45.5 grams (0.18 mole) of alpha-amino-4-methoxy anthraquinone was then added to the filtered solution and the temperature raised to 110° C. for three hours. The resultant product was drowned in acetone, suction filtered and washed with acetone until bleed free. There resulted 54 grams of a solvent resistant orange colored compound possessing excellent lightfastness in cellulose acetate films (200 plus hours in the fadeometer) and corresponding to the structure

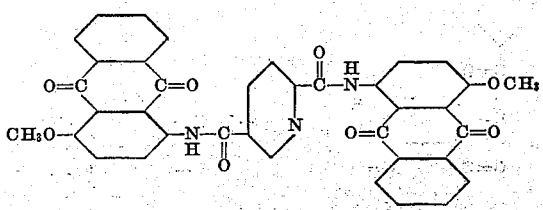

Example 8

150 cc. of ortho-dichlorobenzene and 6.3 grams (0.03 mole) of 3,4-pyridine dicarboxylic acid dichloride were charged into a 3 neck flask. The charge was heated to 50° C. and 10 grams (0.052 mole) of alpha-amino anthaquinone added. The temperature was raised to 105° C.; heated for 3 hours at that temperature and then lowered to 50° C. The resultant product was drowned in acetone, suction filtered and then washed with acetone until the washings were colorless. A yield of 5.5 grams of a yellow colored compound corresponding to the structure

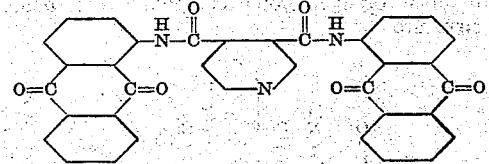

was obtained. The compound was characterized by good lightfastness in a cellulose acetate film (200 plus hours in the fadeometer) and was solvent resistant.

Example 9

The procedure of Example 8 was repeated except that 15 grams (0.044 mole) of alpha-amino-4-benzoyl amino anthraquinone was substituted for alpha-amino anthraquinone. A yield of 7.5 grams of an orange-red colored compound corresponding to the structure

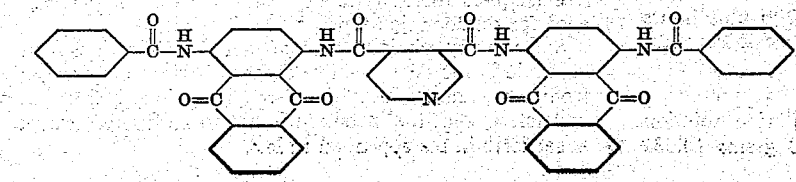

was obtained. The compound was characterized by good lightfastness in a cellulosic acetate film (200 plus hours in the fadeometer) and was solvent resistant.

Example 10

To a solution of 12 grams (0.058 mole) of 3,4-pyridine dicarboxylic acid dichloride in 125 grams of ortho-dichloro-benzene was added 19.5 grams (0.077 mole) of alpha-amino-4-methoxy anthraquinone. The reaction was heated for 3 hours at 150° C., cooled to room temperature, and the resultant product drowned in methanol. After filtering and washing clear with methanol, 18 grams of an orange colored compound corresponding to the structure

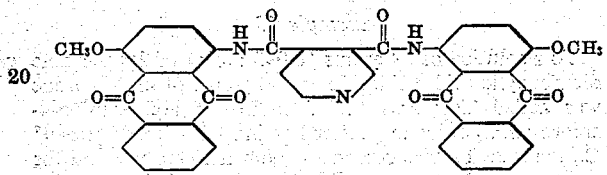

was obtained. The compound had excellent solvent resistance and was very lightfast in a cellulose acetate film (180 plus hours in the AATCC fadeometer).

Example 11

6.3 grams (0.031 mole) of 2-4 pyridine dicarboxylic acid dichloride was reacted with 10 grams (0.045 mole) of alpha-amino anthraquinone in ortho dichlorobenzene at 105° C. for 3 hours. After cooling to 80° C., the product was isolated by drowning in methanol, filtering and washing with alcohol until the washings were colorless. A yield of 12 grams of a khaki colored compound corresponding to the structure

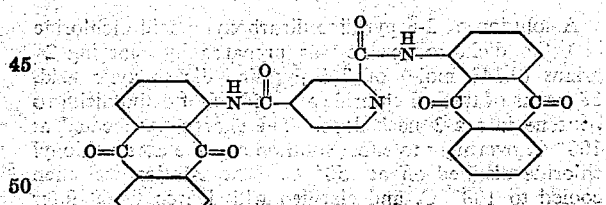

was obtained. The compound was solvent resistant and had good lightfastness in a cellulose acetate film (200 plus hours in the fadeometer).

Example 12

6.3 grams (0.031 mole) of 2-4 pyridine dicarboxylic acid dichloride was reacted with 15 grams (0.044 mole) of alpha-amino-4-benzamido anthraquinone in ortho dichloro benzene at 105° C. for 13 hours. After cooling to 80° C., the product was isolated by drowning in methanol, filtering and washing with alcohol until the washings were colorless. A yield of 17 grams of a red colored compound corresponding to the structure

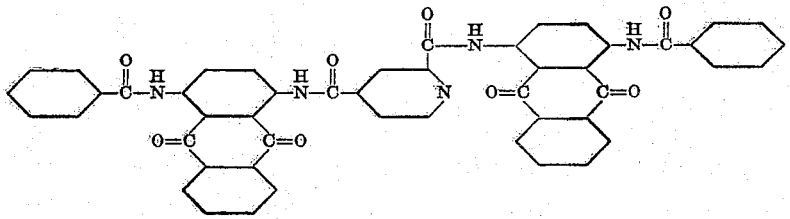

was obtained. The compound had good lightfastness in a cellulose acetate film (200 plus hours in the fadeometer) and was solvent resistant.

Example 13

To a solution of 19 grams (0.093 mole) of 2-4 pyridine dicarboxylic acid dichloride in 250 grams of nitrobenzene was added 22 grams (0.085 mole) of alpha-amino-4-chloro-anthraquinone. After heating for 4 hours at 140° C., the reaction was cooled to room temperature and the resulting product drowned in 600 parts of alcohol. When filtered and washed free with alcohol, a yield of 20 grams of a yellow colored compound corresponding to the structure

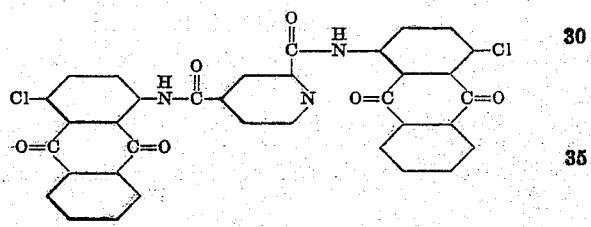

was obtained. The compound was resistant to solvents and was characterized by excellent lightfastness (200 plus hours in the fadeometer).

Example 14

A solution of 2-6 pyridine dicarboxylic acid dichloride in ortho dichlorobenzene was prepared by charging 24 grams (0.143 mole) of 2-6 pyridine dicarboxylic acid, 38 grams of thionyl chloride and 250 cc. of ortho dichloro benzene into a 3 neck flask. The charge was heated at 100° C. overnight to effect solution and the excess thionyl chloride distilled off at 150° C. The solution was then cooled to 100° C. and clarified with Darco G–60 filter cell. (Darco G–60 filter cell is the trade name for an activated carbon produced by the Darco Department of the Atlas Powder Company.)

To one half of the acid dichloride solution was charged 20 grams (0.090 mole) of alpha-amino anthraquinone. After heating the reaction at 115° C. for 3 hours, the resultant product was isolated in conventional manner and a yield of 21 grams of a very greenish yellow compound corresponding to the structure

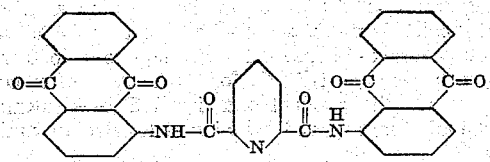

was obtained. The compound was characterized by good lightfastness in a cellulose acetate film (200 plus hours in the fadeometer) and had good resistance to solvents.

Example 15

To the second half of the acid dichloride solution prepared in Example 14 was charged 30 grams (0.089 mole) of alpha-amino-4-benzamido anthraquinone and the reaction heated at 115° C. for 3 hours. After isolating the resultant condensation product in the conventional manner, a yield of 31 grams of an orange-red colored compound corresponding to the structure

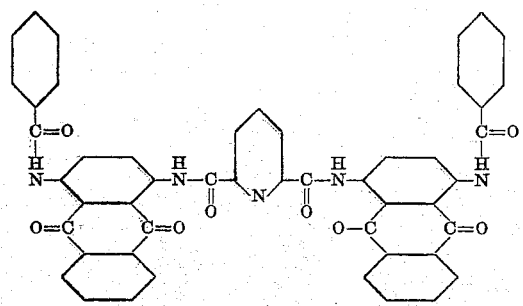

was obtained. The compound was characterized by resistance to solvents and good lightfastness in a cellulose acetate film (200 plus hours in the fadeometer).

Example 16

To a solution of 12 grams (0.059 mole) of 2-6 pyridine dicarboxylic acid dichloride in 125 cc. of nitrobenzene was added 19.5 grams (0.077 mole) of alpha-amino-4-methoxy anthraquinone and the reaction heated at 150° C. for 3 hours. After cooling to room temperature, the condensation product was drowned in 600 cc. of methanol, filtered and washed clear with methanol. 20 grams of an orange colored compound corresponding to the structure

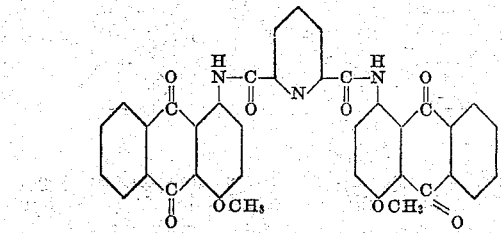

was obtained. The compound was resistant to solvents and was further characterized by good lightfastness in a cellulose acetate film (200 plus hours in the fadeometer).

Our new group of compounds possess highly satisfactory pigmentary properties.

They are useful for both pigment printing and pigment dyeing of textiles with synthetic resin binders and are useful for coloring cellulose acetate and viscose spinning solutions. They are also useful for nitrocellulose lacquers for automobiles, and have sufficient resistance for outdoor sign finishes.

Since many obvious changes and modifications can be made in the details above described without departing from the nature and spirit of the invention, it is to be understood that the invention is not to be limited except as set forth in the appended claims.

We claim:
1. Compounds possessing desirable pigmentary properties and being represented structurally as

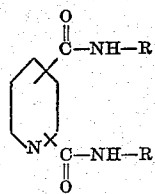

wherein R is a member selected from the group consisting of alpha amino anthraquinonyl radicals, alpha amino methoxy anthraquinonyl radicals, alpha amino chloro anthraquinonyl radicals, alpha amino benzoyl amino anthraquinonyl radicals, and alpha amino benzamido anthraquinonyl radicals.

2. Compounds possessing desirable pigmentary properties and being represented structurally as

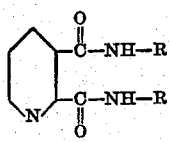

wherein R is a member selected from the group consisting of alpha amino anthraquinonyl radicals, alpha amino methoxy anthraquinonyl radicals, alpha amino chloro anthraquinonyl radicals, alpha amino benzoyl amino anthraquinonyl radicals, and alpha amino benzamido anthraquinonyl radicals.

3. A compound possessing desirable pigmentary properties and being represented structurally as

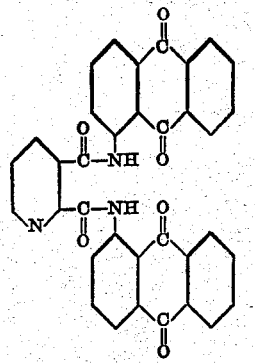

4. A compound possessing desirable pigmentary properties and being represented structurally as

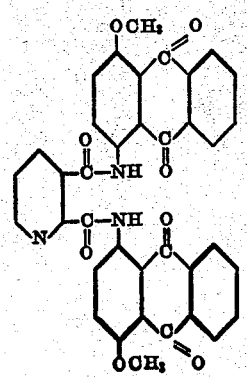

5. Compounds possessing desirable pigmentary properties and being represented structurally as

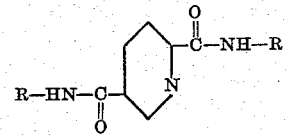

wherein R is a member selected from the group consisting of alpha amino anthraquinonyl radicals, alpha amino methoxy anthraquinonyl radicals, alpha amino chloro anthraquinonyl radicals, alpha amino benzoyl amino anthraquinonyl radicals, and alpha amino benzamido anthraquinonyl radicals.

6. A compound possessing desirable pigmentary properties and being represented structurally as

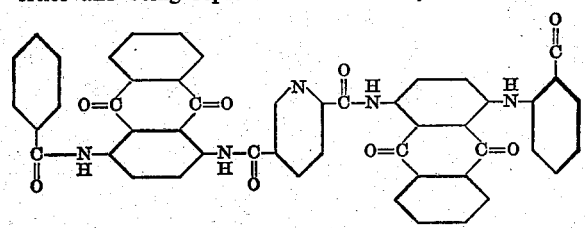

7. A compound possessing desirable pigmentary properties and being represented structurally as

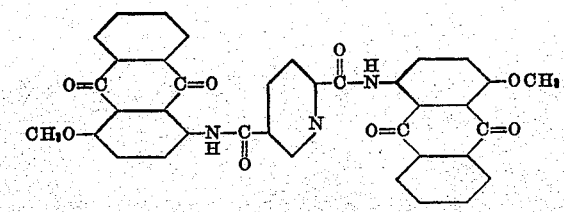

8. A compound possessing desirable pigmentary properties and being represented structurally as

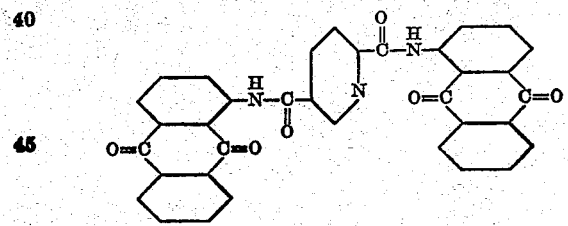

9. The method of preparing compounds possessing desirable pigmentary properties and being represented structurally as

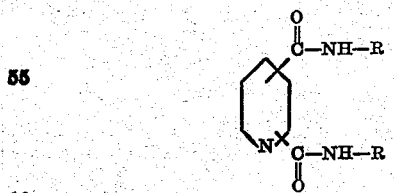

wherein R is a member selected from the group consisting of alpha amino anthraquinonyl radicals, alpha amino methoxy anthraquinonyl radicals, alpha amino chloro anthraquinonyl radicals, alpha amino benzoyl amino anthraquinonyl radicals, and alpha amino benzamido anthraquinonyl radicals, which comprises condensing, in an inert solvent for the reactants, one molecular proportion of a pyridine dicarboxylic acid dichloride with two molecular proportions of an alpha-amino anthraquinone at a temperature not in excess of 150° C.

References Cited in the file of this patent
UNITED STATES PATENTS
2,079,940   Kunz et al. _____ May 11, 1937

UNITED STATES PATENT OFFICE

CERTIFICATE OF CORRECTION

Patent No.. 2,925,421            February 16, 1960

Roy A. Pizzarello et al.

It is hereby certified that error appears in the printed specification of the above numbered patent requiring correction and that the said Letters Patent should read as corrected below.

Column 1, line 35, for "rightness" read -- brightness --.

Signed and sealed this 20th day of September 1960.

(SEAL)
Attest:
KARL H. AXLINE
Attesting Officer

ROBERT C. WATSON
Commissioner of Patents